(12) United States Patent
Lingham (10) Patent No.: US 9,087,329 B2
(45) Date of Patent: Jul. 21, 2015

(54) SYSTEMS AND METHODS FOR BARCODE-BASED GIFT CARD EXCHANGE

(71) Applicant: Gyft, Inc., San Francisco, CA (US)

(72) Inventor: Vinodan Karthikeya Lingham, Palo Alto, CA (US)

(73) Assignee: First Data Corporation, Greenwood Village, CO (US)

(*) Notice: Subject to any disclaimer, the term of this patent is extended or adjusted under 35 U.S.C. 154(b) by 28 days.

(21) Appl. No.: 13/951,698

(22) Filed: Jul. 26, 2013

(65) Prior Publication Data

US 2015/0028099 A1  Jan. 29, 2015

(51) Int. Cl.
| | | |
|---|---|---|
| G06F 17/00 | (2006.01) | |
| G06K 19/00 | (2006.01) | |
| G06K 19/06 | (2006.01) | |
| G06Q 20/34 | (2012.01) | |
| G06Q 20/32 | (2012.01) | |
| G06K 5/00 | (2006.01) | |

(52) U.S. Cl.
CPC .......... *G06Q 20/342* (2013.01); *G06Q 20/3274* (2013.01)

(58) Field of Classification Search
CPC ..... G06Q 20/354; G06Q 20/36; B42D 15/08; B42D 2037/10; G06K 19/00; G06K 19/06028; G06K 19/06037
USPC .................................. 235/380, 375, 494, 487
See application file for complete search history.

(56) References Cited

U.S. PATENT DOCUMENTS

| | | |
|---|---|---|
| 5,991,413 A | 11/1999 | Arditti et al. |
| 6,918,537 B2 | 7/2005 | Graves et al. |
| 7,054,842 B2 | 5/2006 | James et al. |
| 7,083,084 B2 | 8/2006 | Graves et al. |
| 7,093,761 B2 | 8/2006 | Smith et al. |
| 7,418,398 B2 | 8/2008 | James et al. |
| 7,529,563 B1 | 5/2009 | Pitroda et al. |
| 7,774,209 B2 | 8/2010 | James et al. |
| 8,200,544 B1 | 6/2012 | Jones et al. |
| 8,275,712 B2 | 9/2012 | Vollmer et al. |
| 8,285,643 B2 | 10/2012 | Isaacson et al. |
| 8,429,047 B2 | 4/2013 | Hurst et al. |
| 8,442,866 B2 | 5/2013 | Stone et al. |
| 8,452,705 B2 | 5/2013 | Boal et al. |
| 8,463,674 B2 | 6/2013 | Hurst et al. |
| 8,511,543 B2 | 8/2013 | Yankovich et al. |
| 8,521,629 B2 | 8/2013 | Abifaker et al. |
| 8,523,054 B2 | 9/2013 | Yankovich et al. |
| 8,554,655 B2 | 10/2013 | Abifaker et al. |
| 8,566,169 B2 | 10/2013 | Bohanan et al. |
| 8,571,983 B1 | 10/2013 | Blackhurst et al. |
| 8,577,803 B2 | 11/2013 | Chatterjee et al. |
| 8,589,296 B2 | 11/2013 | Boal et al. |
| 8,622,291 B2 | 1/2014 | Sullivan et al. |
| 8,655,762 B2 | 2/2014 | Abifaker et al. |

(Continued)

*Primary Examiner* — Thien M Le
*Assistant Examiner* — Claude J Brown
(74) *Attorney, Agent, or Firm* — Sutherland Asbill & Brennan LLP (57) ABSTRACT

Various of the disclosed embodiments consider systems and methods for the sender of a printed or electronic greeting card to attach one or more virtual or electronic gift cards to that printed or electronic greeting card, so that the recipient of the greeting card can subsequently retrieve and redeem the attached gift cards electronically. Thus, some of the disclosed embodiments provide a system for automating the giving and receiving of electronic gift cards via the medium of the greeting card itself.

18 Claims, 3 Drawing Sheets

(56) References Cited

U.S. PATENT DOCUMENTS

| | | |
|---|---|---|
| 8,671,055 B2 | 3/2014 | Spodak et al. |
| 8,675,840 B2 | 3/2014 | Risafi et al. |
| 8,682,715 B1 | 3/2014 | Cedeno et al. |
| 8,700,472 B2 | 4/2014 | Gray et al. |
| 8,701,982 B2 | 4/2014 | Yankovich et al. |
| 8,768,834 B2 | 7/2014 | Zacarias et al. |
| 2008/0052164 A1 | 2/2008 | Abifaker et al. |
| 2008/0235095 A1 | 9/2008 | Oles et al. |
| 2008/0296368 A1* | 12/2008 | Newsom ................ 235/380 |
| 2009/0234751 A1 | 9/2009 | Chan et al. |
| 2009/0265636 A1 | 10/2009 | Ruiz-Velasco et al. |
| 2010/0325006 A1 | 12/2010 | White et al. |
| 2011/0223895 A1 | 9/2011 | Wagda et al. |
| 2011/0281630 A1 | 11/2011 | Omar |
| 2012/0018501 A1* | 1/2012 | Wilen ..................... 229/68.1 |
| 2012/0030103 A1 | 2/2012 | Hughes et al. |
| 2012/0066043 A1 | 3/2012 | Carmichael et al. |
| 2012/0221422 A1 | 8/2012 | Sobek et al. |
| 2013/0036048 A1 | 2/2013 | Campos et al. |
| 2013/0054470 A1 | 2/2013 | Campos et al. |
| 2013/0077817 A1 | 3/2013 | Naparstek et al. |
| 2013/0110607 A1 | 5/2013 | Basmajian et al. |
| 2013/0117181 A1* | 5/2013 | Isaacson et al. ........... 705/41 |
| 2013/0117646 A1 | 5/2013 | Hansen et al. |
| 2013/0144732 A1 | 6/2013 | Rothschild et al. |
| 2013/0151360 A1 | 6/2013 | Scipioni et al. |
| 2013/0166441 A1* | 6/2013 | Kobylkin et al. ........... 705/39 |
| 2013/0173459 A1* | 7/2013 | Simonian ................. 705/39 |
| 2013/0217333 A1 | 8/2013 | Sprigg et al. |
| 2013/0219254 A1* | 8/2013 | Kashork et al. .......... 715/205 |
| 2013/0254063 A1 | 9/2013 | Stone et al. |
| 2013/0254064 A1 | 9/2013 | Stone et al. |
| 2013/0304605 A1* | 11/2013 | Glass et al. ............. 705/26.5 |
| 2013/0304642 A1* | 11/2013 | Campos .................... 705/41 |
| 2014/0012694 A1 | 1/2014 | Abifaker et al. |
| 2014/0040126 A1 | 2/2014 | Andrews et al. |
| 2014/0058929 A1 | 2/2014 | Boal et al. |
| 2014/0067671 A1 | 3/2014 | De Haven et al. |
| 2014/0081769 A1* | 3/2014 | Wilen et al. ............ 705/14.66 |
| 2014/0136417 A1 | 5/2014 | Spodak et al. |
| 2014/0180918 A1 | 6/2014 | Ekers et al. |
| 2014/0188721 A1 | 7/2014 | Sullivan et al. |

* cited by examiner

SYSTEMS AND METHODS FOR BARCODE-BASED GIFT CARD EXCHANGE

FIELD OF THE INVENTION

Various of the disclosed embodiments relate to gift card exchanges occurring with the aid of a bar code system and a physical or electronic card.

BACKGROUND

While the Internet provides a plethora of opportunities for online transactions, there remains a need for physical contact and exchange. Accordingly, many people still prefer to give and to receive physical cards for special social events (housewarmings, weddings, new babies, etc.). In the past such cards have often been accompanied with a gift. For example, a card celebrating a new child may also include clothing, toys, etc. While such physical cards retain the warmth of interpersonal contact, they lack the versatility of online gift exchanges.

Accordingly, there exists a need for systems and methods facilitating the physical exchange of cards while also permitting the creation and redemption of online gifts. Such redemption must be securely provided to ensure that the physical card is not intercepted by a third party and redeemed inappropriately.

BRIEF DESCRIPTION OF THE DRAWINGS

One or more embodiments of the present disclosure are illustrated by way of example and not limitation in the accompanying figures, in which like references indicate similar elements.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

System Overview

Various of the disclosed embodiments consider systems and methods for the sender of a printed or electronic card (e.g. a greeting card) to attach one or more virtual or electronic gift cards to the printed or electronic greeting card, so that the recipient of the greeting card can subsequently retrieve the attached gift cards electronically.

Printed cards, for example greeting cards, may be typically given to recipients to celebrate special occasions. Such cards may include wedding cards, baby birthing cards, birthdays, etc. (which will be generally referred to herein for purposes of explanation as "greeting" cards). Traditionally, it is not uncommon to accompany the card with a gift, such as a gift card. Some of the disclosed embodiments provide a system for automating the giving and receiving of electronic gift cards via the medium of the physical greeting card itself.

Figure 1:
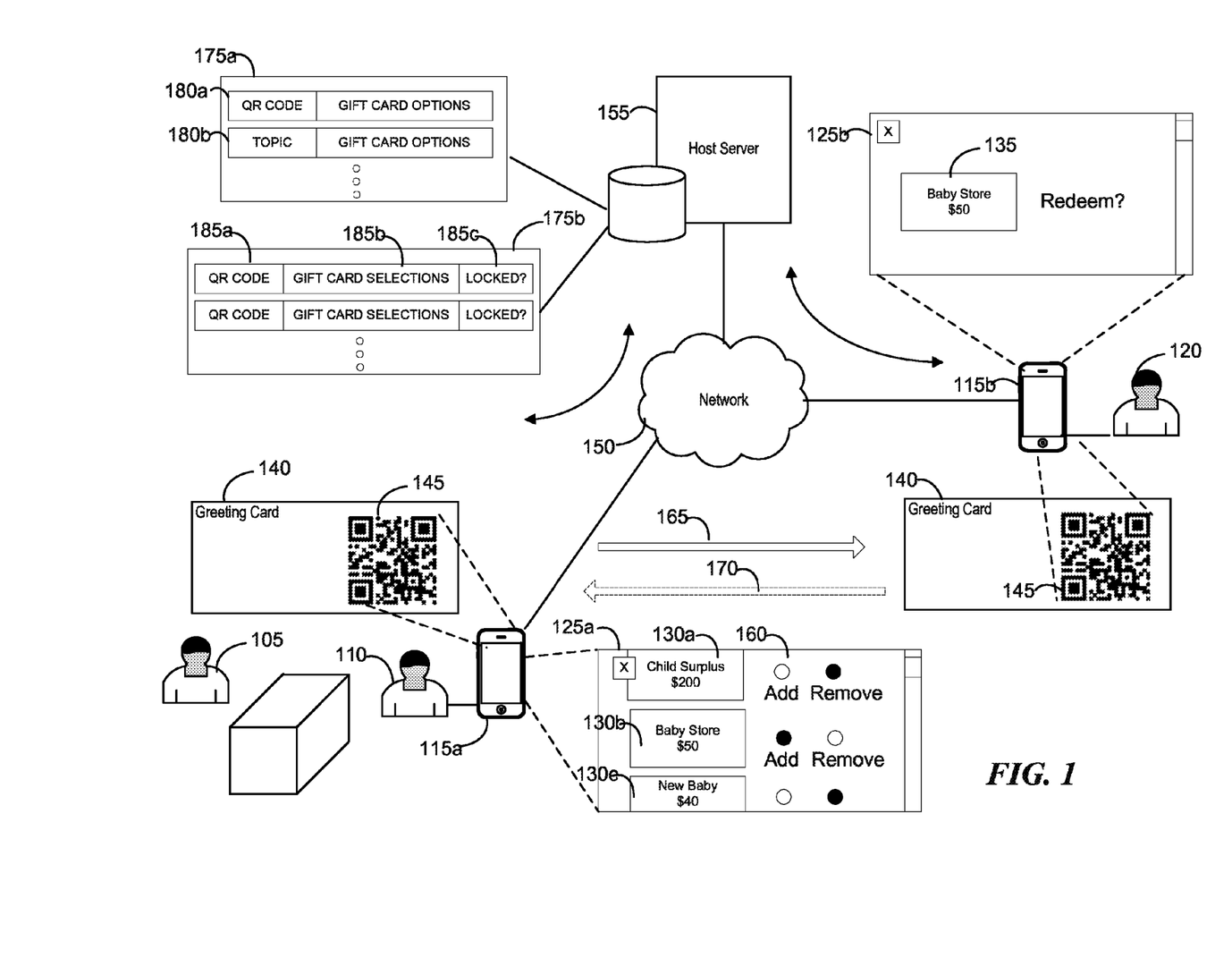
FIG. 1 is a schematic block diagram depicting various elements in a bar-code based card exchange as may be implemented in some embodiments.

FIG. 1 is a schematic block diagram depicting various elements in a bar-code based card exchange as may be implemented in some embodiments. A vendor 105 may sell physical cards 140, e.g. greeting cards, which include a barcode 145 (e.g., printed on the face or back of the card). One example of a barcode is a QR-Code. A purchaser (referred to herein as a sender 110) may capture an image of the barcode 145 with a device, such as a mobile device 115a. The barcode 145 may include a barcode-based identifier associated with the physical card 140. For example, a portion of the barcode 145 may encode a number uniquely identifying the physical card 140.

Capturing the code may produce a selection screen 125a upon the device 115a. For example, the barcode may be associated with a uniform resource locator (URL) link and the mobile device 115a may include software that opens a browser application directed to the URL. Device 115a may communicate with a host server 155 associated with the URL via a network 150, e.g., the Internet. Host server 155 may refer to a plurality of databases 175a-b, e.g., relational databases.

Returning to selection screen 125a, the selection screen 125a may include a plurality of electronic gift card options 130a-c. In some embodiments a preliminary screen may be presented to help the sender 110 identify the character of the occasion for which the card 140 was purchased. In the depicted example, the sender 110 may have indicated that they are welcoming someone to town with a newly born child. Accordingly, a series of gift cards related to newborn purchases may be presented. Controls 160 may be used by the sender 110 to add or remove gift cards and to specify monetary values. Data for the selection screen 125a may be determined in part by the databases 175a-b. For example, a first database 175a may include relationships 180a-b, e.g. between a barcode and available gift card options or between a topic and gift card options, etc. A topic may be referred to as a "context" and may be indicated in a database via a value referred to as a "contextual identifier". These relations may be used to populate the selection screen 125a. For example, some barcodes may be associated with physical gift cards that can only be purchased in particular types of establishments. In this case, a "QR-code to gift card options" relation 180a may suffice (in this example the barcode is a QR code). Another type of card, however, may not be associated with a particular establishment or group or products and so a user selection of a topic (e.g., "newborn baby clothes") may instead be used to identify the corresponding gift card options (e.g. a "Topic to gift card options" relation 180b).

The user's selections may be stored in a separate table or database 175b (although one will recognize many different ways to achieve the same effect using only one database or many databases). This database 175b may specify gift card selections 185b associated with a purchase, the monetary value of the cards, miscellaneous metadata, etc. The database may comprise Structured Query Language (SQL), Extensible Markup Language (XML), JavaScript Object Notation (JSON), etc.

In some embodiments, a sender 110 may also have the option of selecting whether to "lock" the gift card selections 185c. A "locked" selection may not be redeemable by a recipient 120 until after the recipient 120 has contacted the sender 110. For example, the sender 110 may physically present 165 the recipient 120 with the card 140 via mail. To ensure that a malicious person didn't intercept the card, sender 110 may have locked the corresponding gift card (perhaps indicated when making the selection by "locking" the selection). Accordingly, recipient 120 may transmit a message 170 to sender 110 indicating that the card 140 was received. In some embodiments, sender 110 may then unlock the card so that recipient 120 may redeem the gift cards.

The unlocking process may occur automatically in some embodiments when recipient 120 scans the barcode 145 with their personal device 115b. For example, the recipient's identity may be confirmed based on the physical possession of the device 115b. In some embodiments, the sender 110 may specify some identifying characteristic of the recipient's 120 device or of the recipient 120. In some embodiments, the sender 110 may specify a challenge question and an answer to pose to the recipient 120 when making the gift selection. When the recipient correctly provides the answer, the gift may be unlocked.

In a similar manner to the creation of the interface 125a, the redemption interface 125b may be presented on device 115b by contacting server 155 (or a related server with access to the relevant information), and may include one or more redeemable options, such as redeemable option 135.

Purchasing Process

Figure 2:
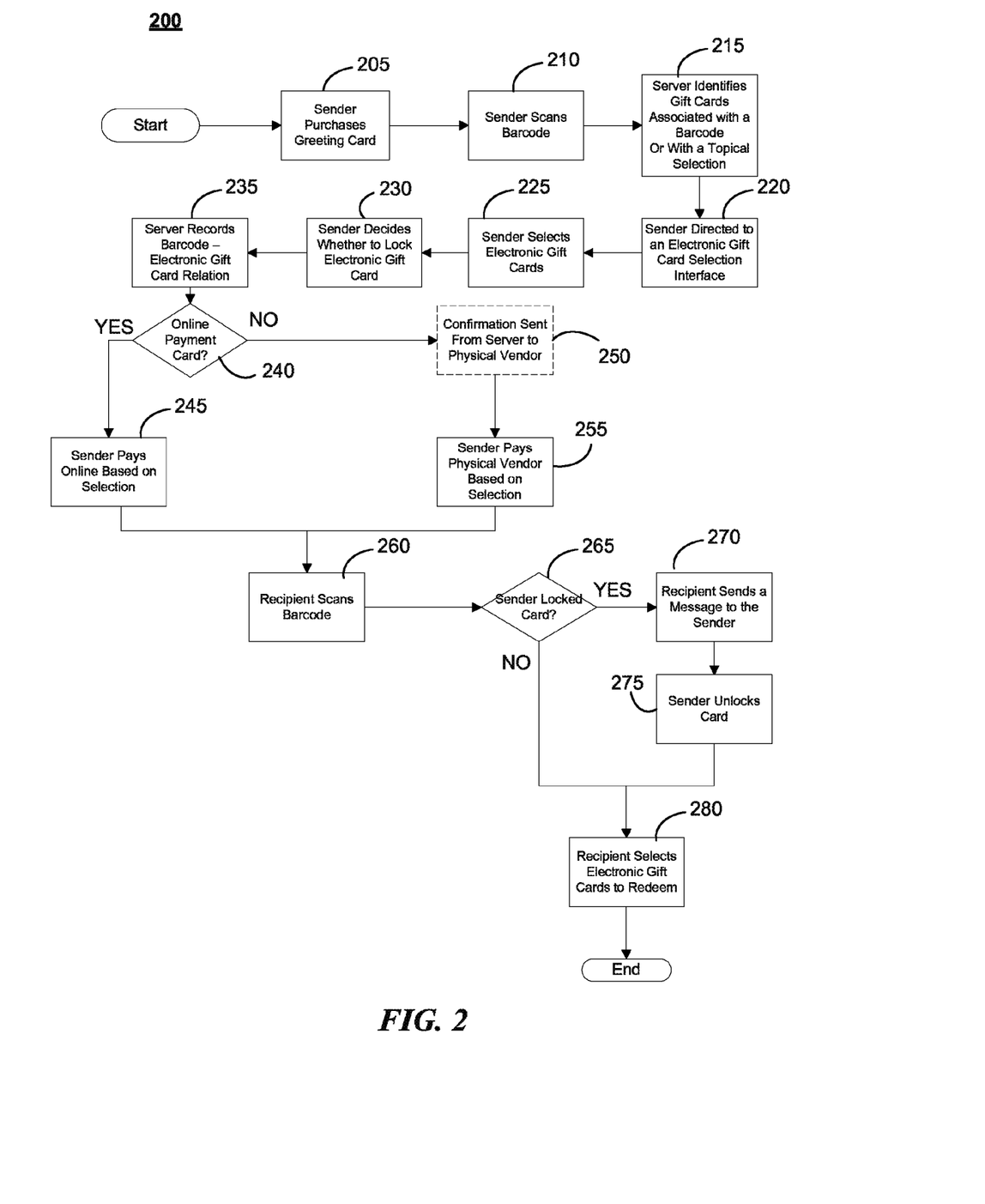
FIG. 2 is a flow diagram depicting various steps in a process for performing a barcode-based card exchange as may be implemented in some embodiments.

FIG. 2 is a flow diagram depicting various steps in a process 200 for performing a barcode-based card exchange as may be implemented in some embodiments.

At block 205 a sender may purchase a card, such as a greeting card.

At block 210 the sender may scan a barcode physically located upon the card. The sender may use a mobile device, such as a cellphone, to scan the barcode, which may be a QR code.

The code may be transmitted to a server. At block 215 the server may identify gift cards associated with the scanned barcode.

At block 220 the sender may be presented with a gift card selection interface. The interface may be a web page in which the sender can purchase gift cards intended for the recipient of that greeting card.

At block 225 the sender may select one or more gift cards from the interface.

At block 230 the sender may decide whether to lock one or more of the selected cards. From a security perspective, there exists the possibility that third parties may photograph a barcode from a card after it has been associated with one or more electronic gifts and then redeem the gifts for their own benefit. As this would require that the third party know that the gift cards have been associated with the physical card, the situation is somewhat unlikely. Still, the sender may use the added security "lock" method in some embodiments, after purchasing the card, to delay activating the gift card until such time as the greetings card is in the hands of the recipient (e.g., for a physical greeting card, physically providing the card to the recipient, for an email greeting card, placing a copy of the email greeting card in their inbox). In some embodiments, the recipient may register with a mobile gifting service, after which the gift cards may be transferred into the recipient's electronic gift card wallet. In some embodiments, it is from the wallet that the recipient may redeem the card value, partially or wholly, in a merchant's physical or online store (possibly the same merchant from which the sender purchased the greeting card). In some embodiments, upon scanning the barcode by the recipient and receiving the gift card in the recipient's wallet, the recipient may be prompted to send a message to the sender, who may then unlock the card. In some embodiments, the sender includes identification information for the recipient with the gift card selection.

At block 235 the sender may submit their selections. The server may make a record of the selections, e.g., as entries in a relational database correlating a barcode value with a plurality of electronic gift cards and their corresponding metadata (monetary value, redemption deadline, etc.). Though reference is often made herein to the barcode or QR code as the identifier of the physical card, one will recognize that this is merely for purposes of explanation and that in some embodiment a separate identifier for a physical or electronic may be encoded in a portion of the barcode, stored at a separate location referenced by a portion of the barcode, a graphical marking, etc.

At block 240 the system, user preference, the character of the greeting card, etc. may determine whether online payment by the sender will suffice. For example, upon checking out from a store, the user may have selected the greeting card as an "impulse" purchase. Payment for the greeting card, the accompanying gift cards, and the primary items originally intended for purchase by the user, may all be accomplished by this single payment. If online payment is chosen, the sender may make the payment online at block 245. Conversely, if the user is including the purchase with an in-store payment, confirmation may be sent to a vendor device at block 250 (e.g., the checkout clerk may be notified of the additional amount to charge the sender based on their gift card selections) before payment is made at block 255. Such vendor involvement may also occur in the online payment scenario as may be readily envisioned (e.g., the vendor may transmit the price of the remaining items for purchase to the server, where the single payment is distributed among all the gift cards, greeting card, and physical items).

The physical greeting card may then be provided to the recipient, who at block 260 may scan the barcode with their own device. The recipient may, for example, use a mobile device to scan the barcode, which may open up a web page in which the recipient can view the gift cards they have been given by the sender.

At block 265 the system, either via an application on the recipient's mobile device, or upon the host server, may determine whether the associated gift cards are locked by reference to the appropriate database tables.

If one or more gift cards are locked, then at block 270, the recipient may send a message to the sender (on their own initiative, or as previously described, automatically via the barcode scanning or similar process, by the sender's request, etc.). At block 275 the sender may unlock the card, e.g., by notifying the server that the recipient is the true recipient. Although sender confirmation is depicted in this scenario, as described above, unlocking may occur without involving the sender, e.g., via a challenge and response to the recipient, or comparison of identifying information at the recipient's device with information provided by the sender.

At block 280, the recipient may redeem the selected gift cards.

Additional Embodiments

In some embodiments, the electronic gift card may be hardcoded into the barcode itself. For example, information for a gift card may be loaded by a vendor directly onto the barcode and the greeting card may then be physically delivered to a recipient. In this manner, only the person scanning the barcode on the receiving end can retrieve the gift card.

In some embodiments, an application on the mobile devices of the sender and recipient may be used to recognize and redeem the barcode. This application may perform the scan by the sender, permit the sender to select a topic context (such as a retailer), pay for the greeting card and electronic gift cards. The application may also report the code and electronic card relation to the server. On the recipient's device, another instantiation of the application may be installed, which may take steps to deliver the electronic gift card(s) to a mobile wallet, e.g. on the recipient's mobile device.

Computer System Overview

Figure 3:
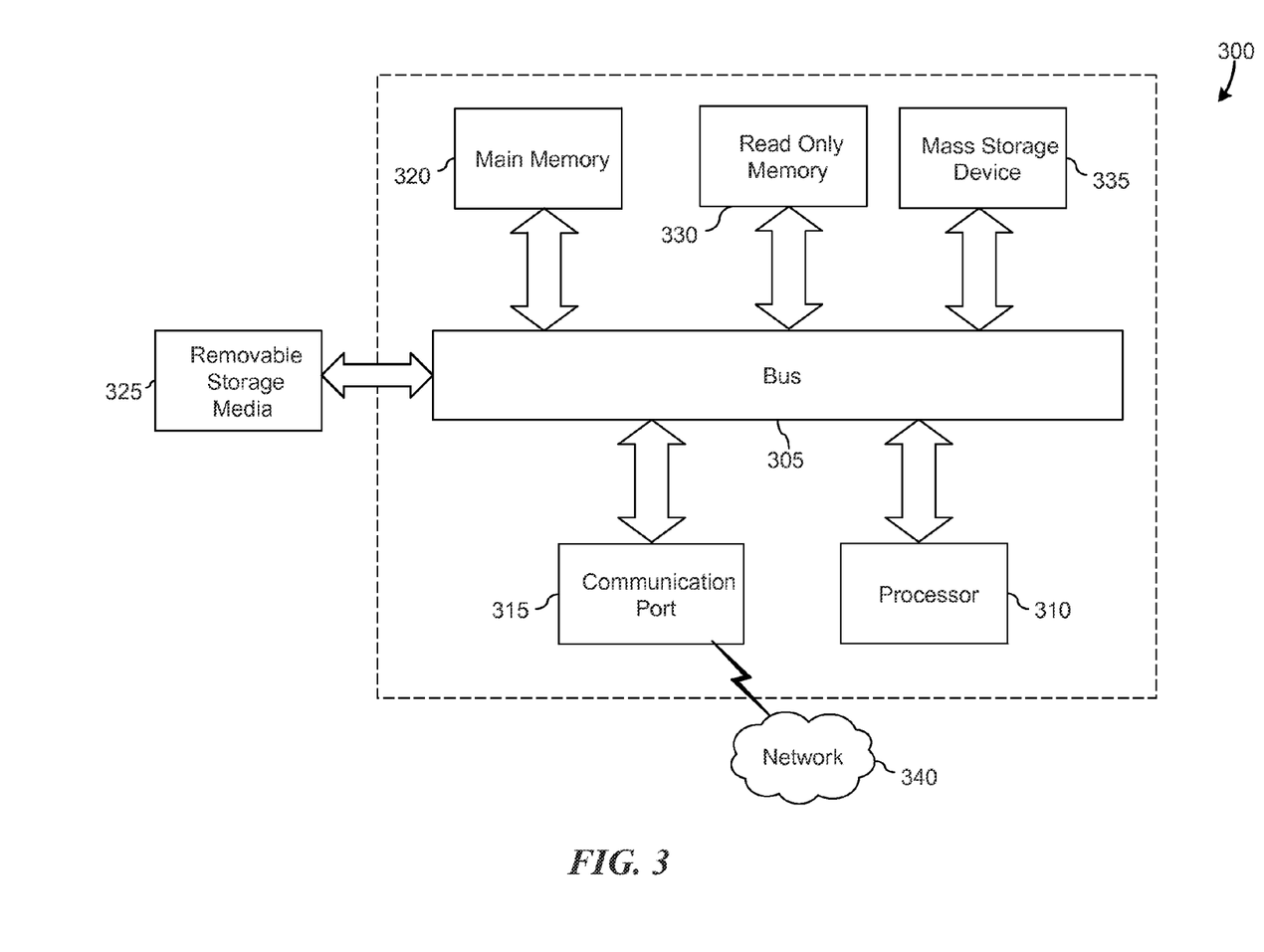
FIG. 3 is a block diagram of a computer system as may be used to implement features of some of the embodiments.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 3 is a block diagram of a computer system 300 as may be used to implement features of some of the embodiments. Various of the disclosed features may be located on computer system 300. According to the present example, the computer system includes a bus 305, at least one processor 310, at least one communication port 315, a main memory 320, a removable storage media 325, a read only memory 330, and a mass storage 335.

Processor(s) 310 can be any known processor, such as, but not limited to, an Intel® Itanium® or Itanium 2® processor(s), or AMD® Opteron® or Athlon MP® processor(s), or Motorola® lines of processors. Communication port(s) 315 can be any of an RS-232 port for use with a modem based dialup connection, a 10/100 Ethernet port, or a Gigabit port using copper or fiber. Communication port(s) 315 may be chosen depending on a network such a Local Area Network (LAN), Wide Area Network (WAN), or any network to which the computer system 300 connects.

Main memory 320 can be Random Access Memory (RAM), or any other dynamic storage device(s) commonly known in the art. Read only memory 330 can be any static storage device(s) such as Programmable Read Only Memory (PROM) chips for storing static information such as instructions for processor 310.

Mass storage 335 can be used to store information and instructions. For example, hard disks such as the Adaptec® family of SCSI drives, an optical disc, an array of disks such as RAID, such as the Adaptec family of RAID drives, or any other mass storage devices may be used.

Bus 305 communicatively couples processor(s) 310 with the other memory, storage and communication blocks. Bus 305 can be a PCI/PCI-X or SCSI based system bus depending on the storage devices used.

Removable storage media 325 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Remarks

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" may also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure. For example, although various steps have been discussed in certain of the flow diagrams, one will recognize that additional steps may be performed or depicted steps omitted to accomplish similar functionality. In some instances optional elements may be indicated by dashed outlines in the flow diagrams, whereas in other elements the optionality may be explicitly stated in the text. One will recognize that many process steps not explicitly indicated as being optional may also be optional depending upon the context. The illustrated example flow diagrams are provided for purposes of explanation rather than as limiting depiction of one or more embodiments. Accordingly the depicted steps are illustrative.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method for processing an electronic gift card in association with a physical card, comprising:

receiving at least one barcode-based identifier from a sender device, the barcode-based identifier uniquely associated with a physical card;

receiving at least one electronic gift card selection from the sender device;

storing the at least one electronic gift card selection in association with the at least one barcode-based identifier;

receiving the at least one barcode-based identifier from a recipient device;

sending a representation of the at least one electronic gift card selection to the recipient device, wherein the representation comprises a barcode redeemable via scanning of the barcode on the recipient device by a merchant;

receiving a first indication from the sender device to lock the at least one electronic gift card selection, wherein locking the at least one electronic gift card selection prevents redemption of an electronic gift card associated with the at least one electronic gift card selection, the first indication comprising first identifying characteristics of the recipient device;

receiving a second indication from the recipient device to unlock the at least one electronic gift card selection, the second indication comprising second identifying characteristics of the recipient device;
comparing the first identifying characteristics of the recipient device with the second identifying characteristics received from the recipient device; and
automatically unlocking the at least one electronic gift card selection based upon the comparison.

2. The computer-implemented method of claim 1, further comprising:
sending a plurality of gift card selections to the sender device based upon the at least one barcode-based identifier.

3. The computer-implemented method of claim 1, further comprising:
sending a plurality of gift card selections to the sender device based upon a contextual identifier associated with the at least one barcode-based identifier, wherein each of the plurality of gift card selections are associated with electronic gift cards providing redemption of goods or services related to a context associated with the contextual identifier.

4. The computer-implemented method of claim 3, wherein the context comprises one of: baby-related goods or services; wedding-related goods or services; and vacation-related goods or services.

5. The computer-implemented method of claim 1, wherein the at least one barcode-based identifier is a Quick-Response (QR) code.

6. The computer implemented method of claim 1, further comprising: receiving a third indication from the sender device to unlock the at least one electronic gift card selection.

7. A non-transitory computer-readable medium comprising instructions executable by at least one processor to cause a computer system to:
receive at least one barcode-based identifier from a sender device, the barcode-based identifier uniquely associated with a physical card;
receive at least one electronic gift card selection from the sender device;
store the at least one electronic gift card selection in association with the at least one barcode-based identifier;
receive the at least one barcode-based identifier from a recipient device;
send a representation of the at least one electronic gift card selection to the recipient device, wherein the representation comprises a barcode redeemable via scanning of the barcode on the recipient device by a merchant;
receive a first indication from the sender device to lock the at least one electronic gift card selection, wherein locking the at least one electronic gift card selection prevents redemption of an electronic gift card associated with the at least one electronic gift card selection, wherein the first indication comprises first identifying characteristics of the recipient device;
receive a second indication from the recipient device to unlock the at least one electronic gift card selection, the second indication comprising second identifying characteristics of the recipient device;
compare the first identifying characteristics of the recipient device with the second identifying characteristics received from the recipient device; and
automatically unlock the at least one electronic gift card selection based upon the comparison.

8. The non-transitory computer-readable medium of claim 7, the instructions further executable by the at least one processor to cause the computer system to:
send a plurality of gift card selections to the sender device based upon the at least one barcode-based identifier.

9. The non-transitory computer-readable medium of claim 7, the instructions further executable by the at least one processor to cause the computer system to:
send a plurality of gift card selections to the sender device based upon a contextual identifier associated with the at least one barcode-based identifier, wherein each of the plurality of gift card selections are associated with electronic gift cards providing redemption of goods or services related to a context associated with the contextual identifier.

10. The non-transitory computer readable medium of claim 9, wherein the context comprises one of: baby-related goods or services; wedding-related goods or services;
and vacation-related goods or services.

11. The non-transitory computer-readable medium of claim 7, wherein the at least one barcode-based identifier is a Quick-Response (QR) code.

12. The non-transitory computer-readable medium of claim 7, the instructions further executable by the at least one processor to cause the computer system to: receive a third indication from the sender device to unlock the at least one electronic gift card selection.

13. A server comprising:
at least one processor;
at least one memory comprising instructions executable by the at least one processor to cause the server to:
receive at least one barcode-based identifier from a sender device, the barcode-based identifier uniquely associated with a physical card;
receive at least one electronic gift card selection from the sender device;
store the at least one electronic gift card selection in association with the at least one barcode-based identifier;
receive the at least one barcode-based identifier from a recipient device;
send a representation of the at least one electronic gift card selection to the recipient device, wherein the representation comprises a barcode redeemable via scanning of the barcode on the recipient device by a merchant;
receive a first indication from the sender device to lock the at least one electronic gift card selection, wherein locking the at least one electronic gift card selection prevents redemption of an electronic gift card associated with the at least one electronic gift card selection, wherein the first indication comprises first identifying characteristics of the recipient device;
receive a second indication from the recipient device to unlock the at least one electronic gift card selection, the second indication comprising second identifying characteristics of the recipient device;
compare the first identifying characteristics of the recipient device with the second identifying characteristics received from the recipient device; and
automatically unlock the at least one electronic gift card selection based upon the comparison.

14. The server of claim 13, the instructions further executable by the at least one processor to cause the server to:
send a plurality of gift card selections to the sender device based upon the at least one barcode-based identifier.

15. The server of claim 13, the instructions further executable by the at least one processor to cause the server to:
send a plurality of gift card selections to the sender device based upon a contextual identifier associated with the at least one barcode-based identifier, wherein each of the plurality of gift card selections are associated with electronic gift cards providing redemption of goods or services related to a context associated with the contextual identifier.

16. The server of claim 15, wherein the context comprises one of: baby- related goods or services; wedding-related goods or services; and vacation- related goods or services.

17. The server of claim 13, wherein the at least one barcode-based identifier is a Quick-Response (QR) code.

18. The server of claim 13, the instructions further executable by the at least one processor to cause the server to: receive a third indication from the sender device to unlock the at least one electronic gift card selection.

* * * * *